June 20, 1961

R. W. TIBBETTS 2,988,804

METHOD OF WINDING ELECTRIC COILS

Filed Aug. 30, 1957

Inventor
Raymond W. Tibbetts
By Roberts, Cushman & Grover
Att'ys

United States Patent Office 2,988,804
Patented June 20, 1961

2,988,804
METHOD OF WINDING ELECTRIC COILS
Raymond W. Tibbetts, Camden, Maine, assignor to Tibbetts Industries, Inc., Camden, Maine, a corporation of Maine
Filed Aug. 30, 1957, Ser. No. 681,393
4 Claims. (Cl. 29—155.57)

In the manufacture of electric coils of substantial size, such as field coils for motors and the like, it is customary to wind the coil on a mandrel with varnish or other settable material between the windings and, after the varnish has set to form a rigid structure, remove the coil from the mandrel. However this method is not feasible for miniature windings of very fine wire, as for example miniature magnetic transducer elements for hearing aids and the like.

Objects of the present invention are to provide miniature windings which have no cores but are self-sustaining, and which have minimum resistance.

According to the present invention the method comprises forming of core material a bobbin having a groove extending around its periphery intermediate its ends, the core material being dissolvable in a solvent, winding wire in the groove until it is partially filled, filling the groove with insulating material which sets in a rigid structure insoluble in the aforesaid solvent, causing the insulating material to set, and subsequently immersing the coil in the aforesaid solvent to remove the core material. The insulating material should have low viscosity so as to penetrate the interstices between the turns of wire; therefore the groove is preferably closed except for a filling opening before the insulating material is applied. If, as is usually the case, the resulting structure should have precise configuration on all sides, the filling opening is closed before the insulating material has set. In the preferred embodiment the bobbin has three or more flat sides, preferably four, all but one side of the groove are closed with flat surfaces engaging the aforesaid flat sides and bridging the groove and, after the insulating material has been poured in through the remaining open side, it is closed with another flat surface engaging the remaining flat side of the bobbin and bridging the groove. While the groove may be uncovered after the insulating material has set and before the core is dissolved, preferably the covering is also made of soluble material which is dissolved at the same time as the core material.

Figure 1:
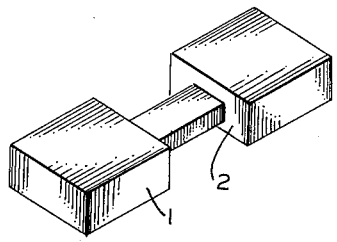
Figure 2:
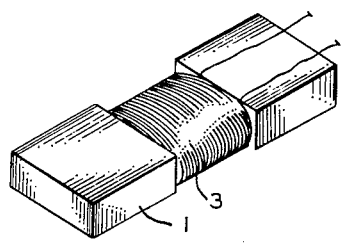
Figure 3:
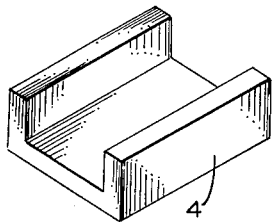
Figure 4:
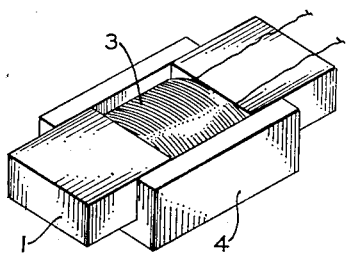
Figure 5:
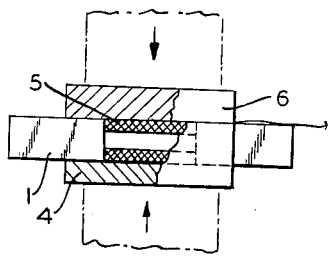
Figure 6:
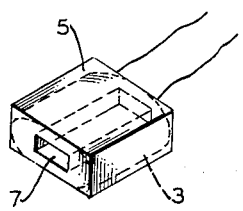

For the purpose of illustration a typical embodiment of the invention is shown in the accompanying drawings in which FIG. 1 is an isometric view of a bobbin;
FIG. 2 is a similar view of the bobbin after being wound;
FIG. 3 is a similar view of a trough for covering the bottom and sides of the groove in the bobbin;
FIG. 4 is a similar view showing the bobbin in the trough preparatory to filling the groove with insulating material;
FIG. 5 is a longitudinal central section through the bottom enclosure after the groove has been filled with insulating material and a cover applied to the trough; and
FIG. 6 is an isometric view of the finished coil.

The particular embodiment of the invention chosen for the purpose of illustration comprises a bobbin 1 molded from plastic material with a groove 2 extending around it intermediate its ends. As shown in FIG. 2 wire 3 is wound in the groove until the groove is partly but not completely filled. Then the wound bobbin is placed in a trough 4 which fits the flat sides and bottom of the bobbin snugly so as to close the groove 2 on all but the top side. Insulating material 5 is then poured into the groove until the groove is completely filled. Then a cover 6 is placed over the open upper side of the trough A completely to close the groove 2. As indicated by broken lines in FIG. 5, the trough and cover may be clamped together to expel any excess insulating material. After the insulating material has set the bobbin and housing are immersed in a solvent which dissolves the bobbin and housing leaving the coil and insulation in the form of a rigid rectangular unit with an opening 7 extending therethrough as shown in FIG. 6.

While various plastic materials may be employed for the bobbin and cover, polystyrene is preferred. Suitable insulating material comprises epoxy resin, in which case it may be caused to set quickly by heating in an oven. When using these materials a suitable solvent is xylene. When winding the wire on the bobbin insulating material is preferably brushed on the turns of wire to insure that all the interstices are filled.

It should be understood that the present disclosure is for the purpose of illustration only and that this invention includes all modifications and equivalents which fall within the scope of the appended claims.

I claim:

1. The method of making an electric coil which comprises forming of core material a bobbin having a groove extending around its periphery intermediate its ends, the core material being dissolvable in a solvent, winding wire in the groove until it is partially filled, except for a filling opening closing said groove with covering material soluble in said solvent, filling the groove through said opening with insulating material which sets in a rigid structure insoluble in said solvent, causing the insulating material to set, and subsequently immersing the closed bobbin in said solvent to remove the core and covering material.

2. The method of making an electric coil which comprises forming of core material a bobbin having a groove extending around its periphery intermediate its ends, the core material being dissolvable in a solvent, winding wire in the groove until it is partially filled, closing said groove on the bottom and sides with covering material soluble in said solvent, filling the groove from the top with insulating material which sets in a rigid structure insoluble in said solvent, closing the top of the groove, causing the insulating material to set, and subsequently immersing the closed bobbin in said solvent to remove the core and covering material.

3. The method of making an electric coil which comprises forming of core material a bobbin having a groove extending around its periphery intermediate its ends, the core material being dissolvable in a solvent, winding wire in the groove until it is partially filled, fitting the bobbin into a trough which closes said groove on the bottom and sides and which is soluble in said solvent, filling the trough with insulating material which sets in a rigid structure insoluble in said solvent, causing the insulating material to set, and subsequently immersing the closed bobbin in said solvent to remove the core and covering material.

4. The method of making an electric coil which comprises forming of core material a bobbin having a groove extending around its periphery intermediate its ends, the core material being dissolvable in a solvent, winding wire in the groove until it is partially filled, fitting the bobbin into a trough which closes said groove on the bottom and sides and which is soluble in said solvent, filling the trough with insulating material which sets in a rigid structure insoluble in said solvent, closing the top of the groove, causing the insulating material to set, and subsequently immersing the closed bobbin in said solvent to remove the core and covering material.

References Cited in the file of this patent

UNITED STATES PATENTS

| | | |
|---|---|---|
| 786,257 | Beebe | Apr. 4, 1905 |
| 1,650,605 | Campbell | Nov. 29, 1927 |
| 1,893,262 | Apple | Jan. 3, 1933 |
| 2,552,999 | Pannell et al. | May 15, 1951 |